United States Patent [19]

Ellion et al.

[11] Patent Number: 4,696,356

[45] Date of Patent: Sep. 29, 1987

[54] GUN POWDER DISPENSING AND MEASURING APPARATUS

[76] Inventors: Dolores D. Ellion; Max E. Ellion, both of 2152 Highland Oaks Dr., Arcadia, Calif. 91006

[21] Appl. No.: 818,723

[22] Filed: Jan. 14, 1986

Related U.S. Application Data

[63] Continuation-in-part of Ser. No. 688,220, Jan. 2, 1985.

[51] Int. Cl.⁴ .................... G01G 13/02; G01G 23/10
[52] U.S. Cl. .................... 177/123; 177/185; 177/DIG. 6
[58] Field of Search .......... 177/123, 185, 195, DIG. 6

[56] References Cited

U.S. PATENT DOCUMENTS

| | | | |
|---|---|---|---|
| 1,018,173 | 2/1912 | Dunn | 177/195 X |
| 1,332,116 | 2/1920 | Ewing | 177/195 X |
| 2,886,302 | 5/1959 | Coffman, Jr. et al. | 177/185 |
| 3,472,327 | 10/1969 | Meier | 177/185 |
| 3,827,513 | 8/1974 | Epstein | 177/DIG. 6 |
| 3,970,159 | 7/1976 | Hahn | 177/123 |
| 4,074,507 | 2/1978 | Ruf et al. | 177/123 X |
| 4,102,421 | 7/1978 | Ozaki et al. | 177/185 |

*Primary Examiner*—George H. Miller, Jr.
*Attorney, Agent, or Firm*—Donald D. Mon; David O'Reilly

[57] ABSTRACT

An automatic powder dispensing and measuring apparatus which automatically and rapidly and accurately delivers a preselected amount of powder such as gun powder to a scale. The powder dispensing apparatus is preferably in the form of screw threaded barrels rotatably driven by an electric motor which pick up powder from a chamber and dispense it from the end of the barrel to a scale. An electronic circuit controls the rotation speed of the screw threaded barrels in response to sensing means which cause no mechanical resistance to scale motion, positioned to sense the weight being measured by the scale. As the scale approaches the precise preselected amount of powder the electronic circuit responds by slowing the rotational rate of at least one of the screw threaded barrels to slow the feed rate and stop the rotation and flow of powder when the weight the scale reaches the precise preselected amount.

20 Claims, 8 Drawing Figures

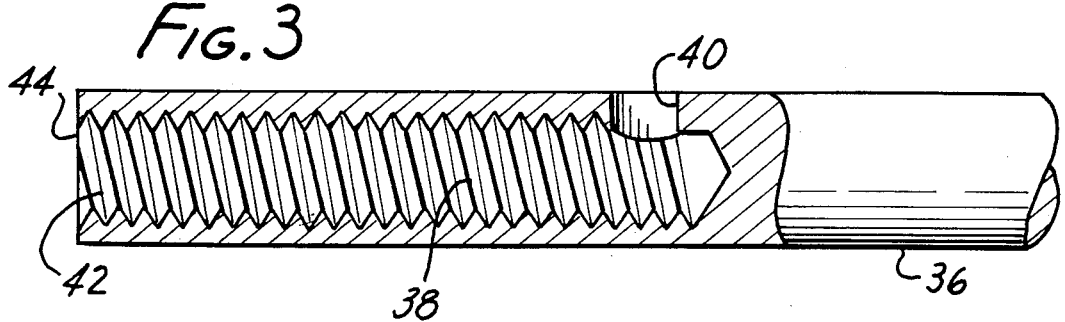
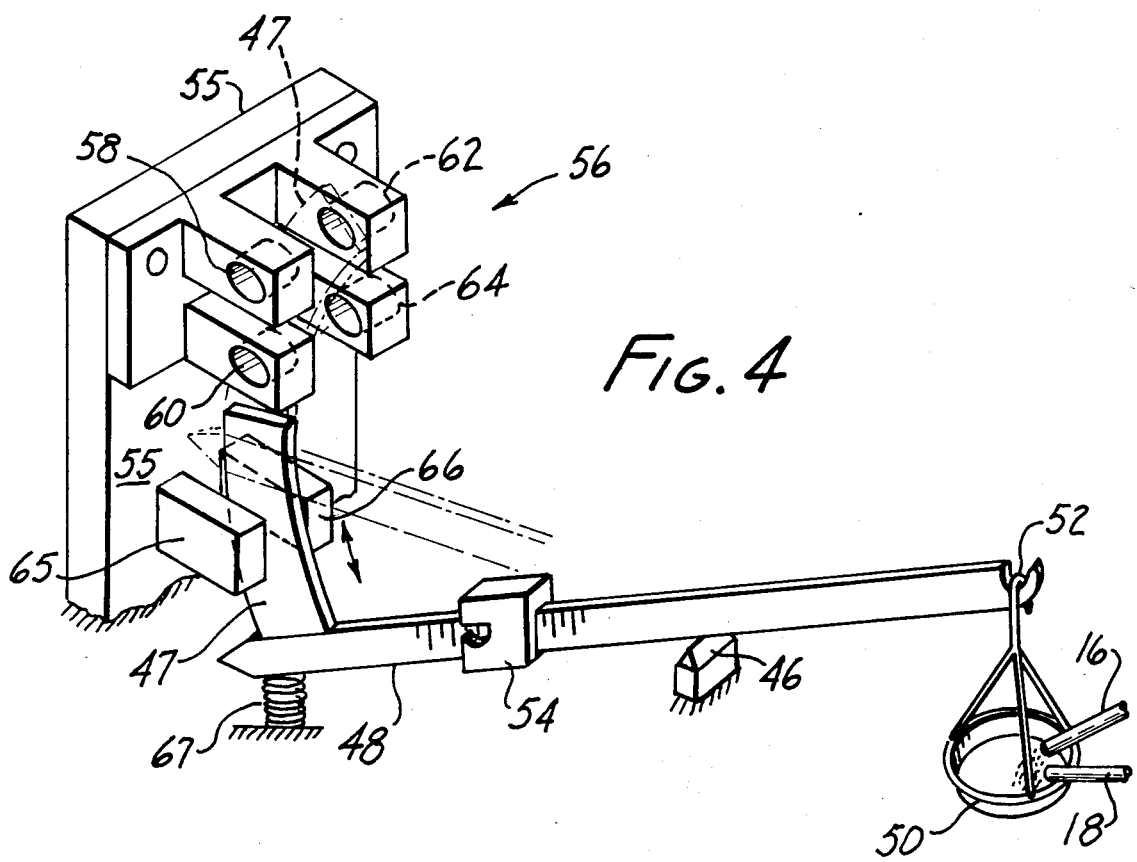
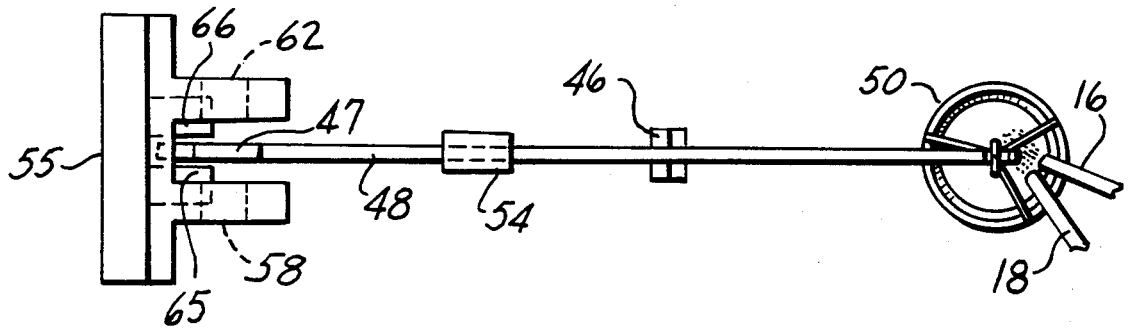

ically, rapidly, and accurately measuring an amount of gun powder being dispensed, so as to improve the convenience and accuracy of hand-loading cartridges. There are devices which provide rapid dispensing or alternatively accurate dispensing, but none presently known which provide both rapid as well as accurate dispensing of gun powder. There is one system which automatically dispenses gun powder to a scale described in U.S. Pat. No. 2,833,506 but its accuracy and speed depend upon mechanically constructed devices having mechanical friction in the sensor mechanism which can cause uncertainties in the dispensing operation. That patent describes a feeder system constructed with a chute to vary the trajectory of a powder as it is being dispensed to limit the amount of powder distributed to a tray mounted on a scale. The mechanical tilting is electrically controlled to slow the flow through a notch in the chutes which limits the amount of gun powder that falls on a scale. The need to control this tilting action is what gives rise to the uncertainty.

GUN POWDER DISPENSING AND MEASURING APPARATUS

CROSS-REFERENCE TO OTHER PATENT APPLICATION

This application is a continuation-in-part of Dolores D. Ellion U.S. patent application, Ser. No. 688,220, filed Jan. 2, 1985, entitled "Gun Powder Dispensing and Measuring Apparatus".

FIELD OF THE INVENTION

This invention is related to gun powder measuring devices and more particularly is related to devices for quickly and precisely measuring preselected amounts of gun powder.

BACKGROUND OF THE INVENTION

This invention is directed to an apparatus for automatically, rapidly, and accurately measuring an amount of gun powder being dispensed, so as to improve the convenience and accuracy of hand-loading cartridges. There are devices which provide rapid dispensing or alternatively accurate dispensing, but none presently known which provide both rapid as well as accurate dispensing of gun powder. There is one system which automatically dispenses gun powder to a scale described in U.S. Pat. No. 2,833,506 but its accuracy and speed depend upon mechanically constructed devices having mechanical friction in the sensor mechanism which can cause uncertainties in the dispensing operation. That patent describes a feeder system constructed with a chute to vary the trajectory of a powder as it is being dispensed to limit the amount of powder distributed to a tray mounted on a scale. The mechanical tilting is electrically controlled to slow the flow through a notch in the chutes which limits the amount of gun powder that falls on a scale. The need to control this tilting action is what gives rise to the uncertainty.

Methods for rapid dispensing are often based on a mechanical loader that has an adjustable volume for selection of the desired load. These types of mechanical loaders typically have a movable piston in a cylinder to choose the volume of the desired load. The loaded powder is either translated to a dump opening or rotated on a master cylinder to a dump opening. Since most gun powder in not spherical in shape, but instead cylindrical, it is not possible to obtain extremely accurate or reproducible loads by volume measurements alone. Their accuracies can vary appreciably with the size of the grain.

There is a method of measuring an extremely accurate amount of gun powder but it is very slow and tedious. This method involves the use of a precision scale which is the most accurate method of measuring precise amounts of gun powder known in the art. However, this method requires appreciable time and patience to place precise amounts of powder onto the weighing tray. Because this method is so tedious, most operators will use the scale only for an occasional check of the accuracy and reproducibility of their more rapid mechanical loaders. A reproducibility of ±0.1 grains is possible with most gun powder precision scales, used by a careful operator. The reproducibility, however, is limitied by the friction of the balance pivot points for a balance scale and the ability of the operator to accurately judge when the precise level mark of the scale is reached. Direct reading scales do not rely on an operator's judgement, but these are considerably more expensive than precision balance scales and they still require a tedious procedure to place an accurate quantity of powder on the scale.

Accurate measurements of gun powder within ±0.1 grains are necessary if the shooter's aim is to be accurate. Also, if a shooter wants to load his shells with the maximum charge that his gun can safely withstand it is vital that the measurement of the powder be controlled to at least ±0.1 grains to prevent overloading a cartridge shell, which could possibly damage the gun or even injure the shooter.

It is therefore one object of the present invention to provide a powder dispensing apparatus which can rapidly and accurately dispense precise amounts of powder.

Yet another object of the present invention is to provide a powder dispensing apparatus which can measure and dispense a precise amount of gun powder using any type of scale or it can be built into a specially constructed scale.

Still another object of the present invention is to provide a powder dispensing apparatus which utilizes one or more rotatable barrels to convey powder to a scale.

Yet another ojbect of the present invention is to provide a powder dispensing apparatus for measuring precise amounts of gun powder which utilizes optical-electronic sensing means adaptable to any scale that has a beam or deflectable structure, with no inherent mechanical friction.

BRIEF DESCRIPTION OF THE INVENTION

The purpose of the present invention is to provide a powder dispensing apparatus which can be used with almost any standard scale that is in reasonably good condition to provide a reproducibility of powder measurements in the range of ±0.03 grains with the dispensing accomplished in a relatively short period of time, by an inexperienced operator. The accuracy of the measurement depends entirely on the accuracy of the balance scale based on the condition of balance pivots. It is not dependent on the dexterity or skill of the operator. Another advantage of the invention is that it allows the operator visually to verify by watching the balance arm or scale when the dispenser has delivered a correct load. This feature provides protection against electrical failure or other failures that may result in incorrect amounts of loads being dispensed. The invention as conceived and constructed is capable of dispensing any type of free flowing powder such as common gun powder with equal reproducibility. The reproducibility is only limited by the particle size, (i.e., coarseness) and the weight of a single particle of the powder.

In its preferred embodiment, this invention is comprised of one or more rotating barrels which provide coarse and fine (i.e., fast and slow) feeding of powder grains to a receiving tray on any suitable scale in response to the control of an electronic sensor. The dispensing barrels may have internal threads in communication with a port positioned in a chamber or hopper which pick up the powder and move it along the barrel and out the end to the receiving tray of a scale. Preferably the receiving tray will be on one end of a scale beam or flexure, which for convenience is called a "balance arm". As the receiving tray receives more of the dispensed powder, the scale balance arm moves toward a final balanced position representative of a correct load. Sensors positioned to detect or sense the movement of the balance arm switch the driving mechanism for the barrels from a faster flow rate to a slower flow rate as the balance arm approaches the arm position representative of a correct load.

Preferably there are two barrels, with one dispensing powder at a faster rate than the other. The faster barrel has a smooth interior and is oriented with the exit in a downward position. The barrel is connected to a fast rotation motor. The static friction is sufficient to prevent the free flow of powder when the barrel is not rotating. The dynamic friction is sufficiently low that the powder flows rapidly when the barrel is rotating. The sensor stops the faster-dispensing barrel when the scale balance arm approaches the final balance arm position, and the other barrel continues its slow feed. The slower barrel has a threaded interior and is oriented in an upward position. The sensing device can be in the form of a light emitting diode (LED) and a detecting phototransistor positioned to be interrupted by a blade attached to the balance arm of a scale. When the first photo detector is interrupted, the slower-dispensing barrel continues to provide a trickle of powder onto the scale tray until the balance arm reaches the desired position. At this point, the fine or slow dispensing screw threaded barrel is stopped or turned off by a second LED/phototransistor combination, because a light beam to it is interrupted at the precise moment of correct load by the blade on the balance arm. Since such sensors are much more sensitive to position than is attainable by visual observation of an operator who is trying to determine the level mark, greater accuracy is achievable. The sensors require no physical contact with the balance arm, and consequently do not affect the motions of the scale.

There are at least several types of electronic circuits that can receive and treat the signal from the sensors, to properly control drive mechanisms that cause powder to be supplied. Examples of mechanisms to be controlled are such as electric drive motors which separately turn each of the feed barrels, or a single drive motor driving both barrels through a gear mechanism. A single drive motor driving a single barrel at a constant steady rate for fast flow and is then switched to a pulsing drive signal for slow flow would also be suitable.

The above and other features of this invention will be fully understood from the following detailed description and the accompanying drawings, in which:

BRIEF DESCRIPTION OF THE DRAWINGS:

FIG. 3 is a detailed view of a screw-threaded barrel in partial axial section;

FIG. 4 is a perspective view in semi-schematic form illustrating sensing devices mounted relative to a balance beam of the scale which measures the weight of the delivered powder;

FIG. 5 is a top view of the embodiment of FIG. 4;

Figure 1:
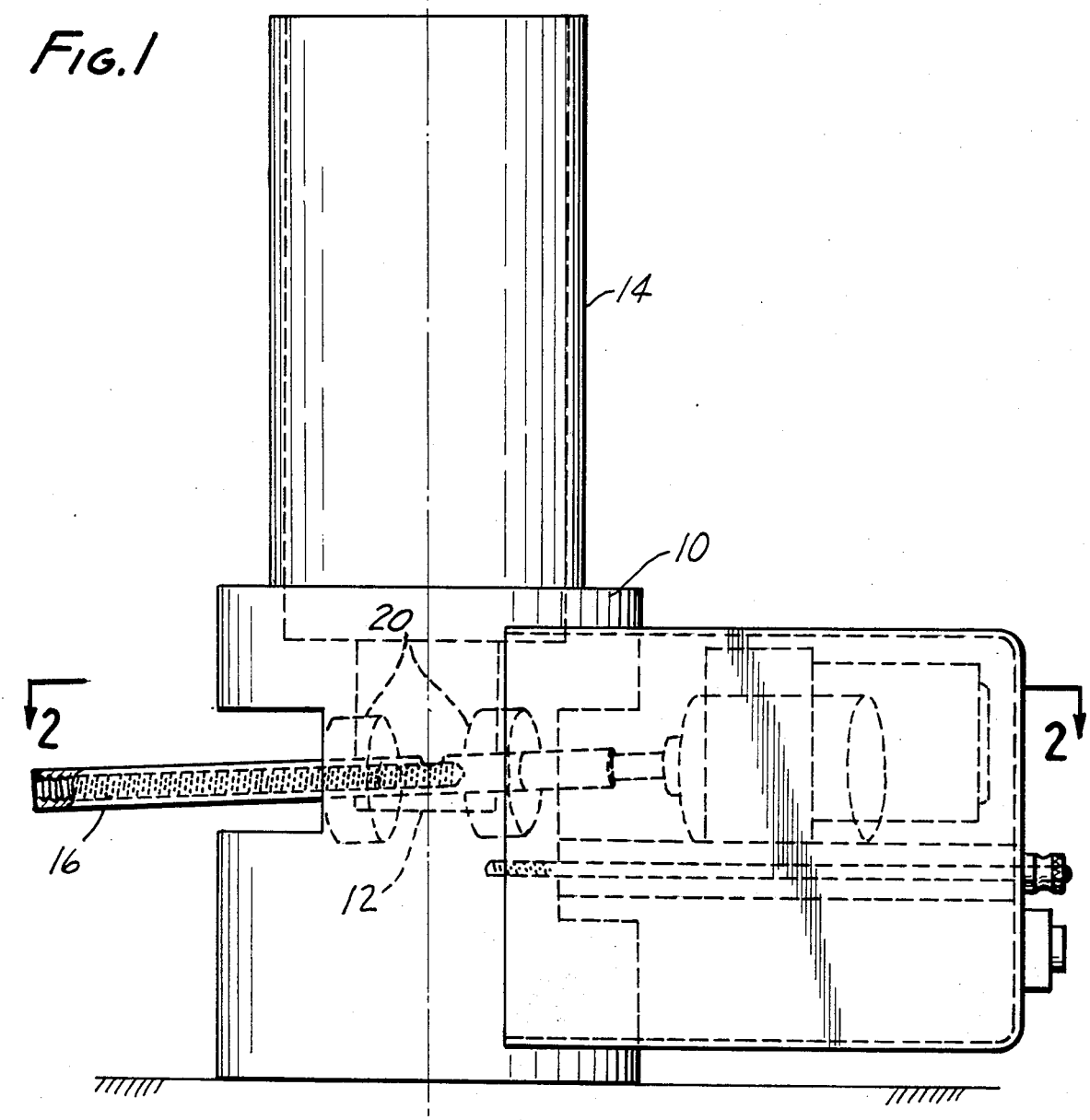
FIG. 1 is a side elevation of a powder dispensing apparatus assembly constructed according to the invention.
Figure 2:
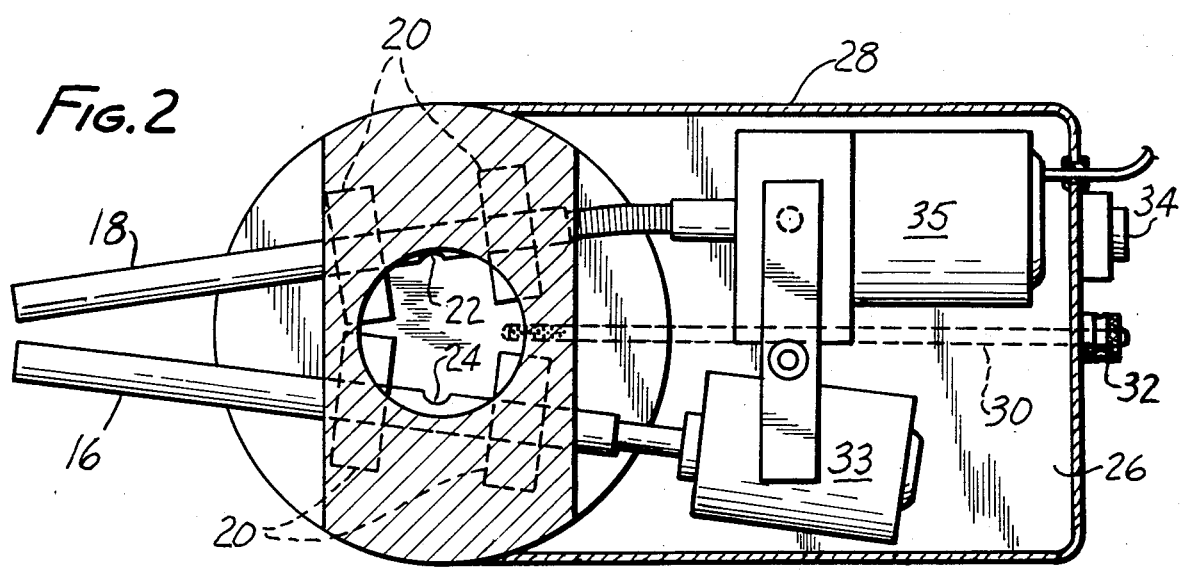
FIG. 2 is a cross-section view of the base and powder chamber of this apparatus taken at 2—2 of FIG. 1.

DETAILED DESCRIPTION OF THE INVENTION:

The presently-preferred embodiment of dispensing apparatus according to this invention is shown in side elevation in FIG. 1, and in sectional view in FIG. 2. A base 10 provides a chamber or bowl 12 to act as a hopper for gun powder poured into funnel 14. A pair of barrels 16 and 18 extend into bowl 12. Each has a respective entry ports 22 and 24 for continuously receiving powder from the chamber 12 and admitting into the bore of the barrel. The barrels are rotatably mounted in bushings or bearings 20 and are driven by motors 33 and 35, respectively. Preferably each barrel is driven by a separate motor 33, 35, respectively. Alternatively both barrels could be driven by a single motor through drives that turn the barrels at different rotary velocities. As another alternative, a single barrel might instead by selectively driven by a slow motor and a fast motor, or by a single motor which can be operated at a fast and at a slow velocity. For example, the use of two separate barrels is preferable, for reasons which will become apparent.

Motors 33 and 35 are mounted on a platform 26 enclosed by a housing. A shaft 30 and cap nut 32 hold the housing enclosure 28 in place. A momentary push buttom on/off switch 34 is mounted on enclosure 28 to start the apparatus.

Barrels 16 and 18 are substantially identical, although the fast rotating barrel 16 preferably has a smooth interior or the pitch of their threads could be different, if desired. Slow rotating barrel 18 is shown as an example of both in FIG. 3. It comprises a shaft 36 having a bore 38 open at one end 44. An aperture or port 40 at the interior end of the bore passes through the side wall of the shaft. The bore is internally threaded by threads 42 from dispensing end 44 to beyond port 40. The pitch of threads 42 is selected according to the flow rate desired, related to the intended rotary velocity. For example, for a fast flow rate the pitch of the threads may be rather coarse, or even infinite (i.e. smooth) while for a slower or fine flow rate the pitch of the threads will be finer to provide a slow trickle of powder to the scale. The delivery rate will be further modified by the angular rotational velocity. This relates to an embodiment of the invention utilizing two different interiorly threaded or smooth barrel means for dispensing the powder. Alternately, both barrels could have the same pitch and the rate of flow could be controlled by varying the rotational speed of the motors.

A unique advantage provided by internally threaded barrels is that the flow rate can be controlled by the pitch of the internal threads 42 and also by the rotational velocity. This enables an extremely fine control over the delivery rate, with the use of very simple apparatus. An additional control of the powder feed rate is obtained by orienting the exit of the fast barrel downward, typically 3 degrees and orienting the slow barrel upward by approximately 1 degree.

Mechanism for sensing the operation of the scale is illustrated in FIGS. 4 and 5. The scale shown in FIG. 4 is a normal balance beam type having a pivot point at 46, a balance arm 48, (or beam) and a tray at 50 humg from the opposite end 52 of the balance beam. A weight 54 provides for precise selection of the weight of powder to be delivered. A sensor system 56 is mounted adjacent to the balance arm. It includes a pair of optical-electronic combinations. A lower combination is a light source 60 and a light receptor 64. An upper combination is a light source 58 and a light receptor 62. The light source may conveniently be a light-emitting diode, and the light receptor may conveniently be a photo-sensitive transistor. Specific light frequencies may be emitted and sensed in these combinations so as to make the system less sensitive to ambient light, if desired.

The operation of the system can be seen by reference to FIGS. 4 and 5. Arm end 48 rises as powder on tray 50 increases causing interrupter blade 47 to pass between photosensitive cell 60 and LED 64. This stops fast motor operation reducing the flow of powder to the slower flow rate. This slower rate continues until the interrupter blade 47 passes between light emitting diode 58 and photo detector 62. This stops the slow flow rate of powder from barrel 18.

Figure 6:
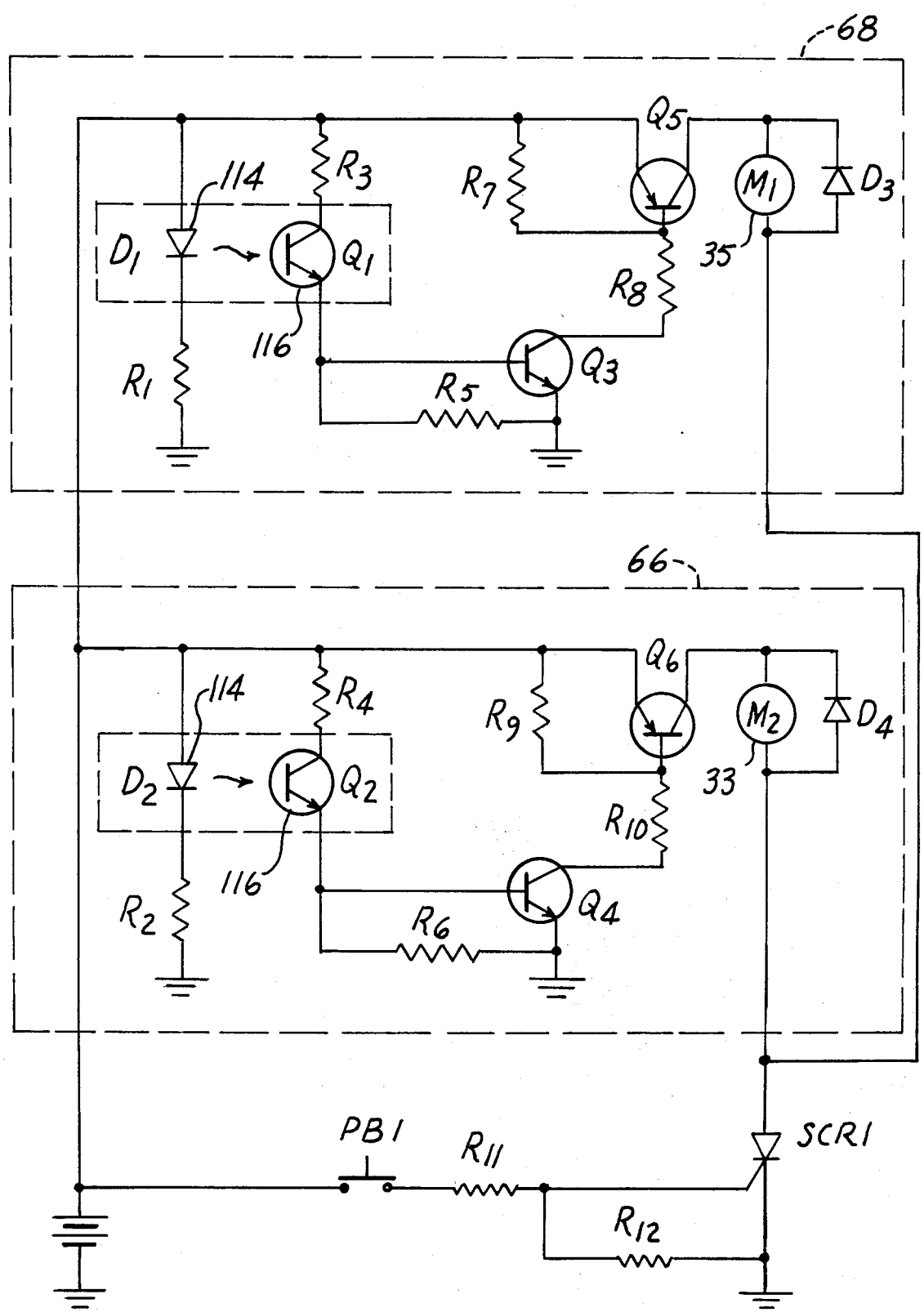
FIG. 6 is a schematic diagram of a useful electronic control circuit.

A schematic diagram of a typical circuit for driving the screw threaded barrels is shown in FIG. 6. In this Fig. circuits 66 and 68 control operation of barrels 16 and 18. Circuits 66 and 68 for controlling the on/fast and slow/stop functions are identical. In each, a light emitting diode 114 is provided which is energized by a low voltage DC power supply when switch PB1 is operated. An advantage of this system is its ability to run equally well with any DC source above 3 volts. A low voltage is particularly advantageous when dealing with highly ignitable materials such as gun powder. Powder may be supplied to the circuit by a common wall plug and transformer or in field operation by batteries. Power is supplied to the motors as long as the photo-transistors 116 continue to receive a beam from diodes 114. Interruption of the beam causes the fast motor circuit to first shut off power to the fast motor connected to that circuit and then the slow motor circuit to shut off the slow motor. Power will remain off until the interrupter blade 47 is repositioned and the circuit is reset by operation of switch PB1 to activate the control rectifier (SCR1). Thus SCR1 prevents continued operation of circuit 66 and 68 until pushbutton switch PB1 is reactivated. This prevents the feed system from restarting when the measured amount of gun powder in tray 50 is dumped allowing the balance arm 48 to return to the start position. Without SCR1 the circuit would automatically restart when the tray was removed and interrupted blade 47 was no longer between the sensors.

Momentary operation of switch PB1 activates the circuits 66 and 68 to initiate delivery of powder at a fast flow rate. As described previously the increase in weight on tray 50 causes interrupter blade 47 to rise until the beam between lower diode 60 and photo-transistor 64 is blocked.

This shuts off motor 33 stopping fast flow from coarse feed barrel 16 which may have a smooth interior or a coarse thread. Powder continues to flow from slow flow, fine feed barrel 18 which preferably has a relatively fine thread typically 24 threads per inch. As the scale approaches a balanced state the beam from diode 58 to upper detector 62 is interrupted by blade 47 shutting off motor 35 and stopping the flow at precisely the preselected weight. The electronic circuits and sensing devices can be adapted to nearly any scale to respond to movements of the scale as powder is delivered from a dispensing apparatus.

Of course it should be noted that all electrical components are constructed to prevent the occurence of sparks which are dangerous near gun powder. While voltages used are extremely low such precautionary steps as heavily coating contacts with insulating material and enclosing them in protective covers to isolate any possible sparks which might occur should be followed. An additional precautionary step is the installation of a common choke coil in the main power lead as a current limiter to prevent a spark should any conductive material bridge a positive to ground potential. Of course one should recognize that the automatic loading system described is not for use with the dangerously sensitive material known as "black powder" once used in muzzle loading guns but no longer used in modern firearms. Numerous variations for controlling the delivery of powder to any scale are possible with the system described. For example, with two separate internally threaded barrels the flow rate can be controlled by thread pitch as well as by rotational speeds and/or orientation of the barrels. Powder can be delivered at high flow rate from a coarse threaded or smooth interior barrel simultaneously with a slow flow rate from a fine threaded barrel. The system switches from fast flow rate to slow flow rate by simply stopping rotation in the coarse threaded barrel. Accurate weight measurement is achieved by simply stopping rotation of the finely threadedd barrel when the scale is balanced. Accurate weight is achieved as there is no mechanical resistance to the balance arm from the dispensing apparatus.

The powder dispensing apparatus described has a variety of operational designs and features. Among these are the ability to adapt the system to almost any type of scale; the ability to replace the threaded barrels and motors with a single motor or screw threaded barrels driven through a series of gears or pulleys. Alternately a single barrel can be driven by a single speed controlled motor or turned off and back on at a different rate to vary the feeding rate. Dual screw threaded barrels driven by separate motors is preferred because of easier control and a reduction in the complexity of the overall system. Of course the flow rate can also be controlled by having a different thread pitch in each barrel. As a further alternative, an externally threaded shaft rotatable with a tube can be substituted for the internally threaded barrels.

As mentioned above, the fast feed screw threaded barrel can be replaced with a barrel that rotates slowly, but has a large (i.e., very coarse) pitch thread or in extreme have a smooth interior to feed to powder faster by feeding a greater volume. Other devices that do not require physical contact with the balance arm could be substituted for the LED-optical transistor combination if desired. Control of the flow rate from the fast and slow dispenser screw threaded barrels can also be accomplished by adjusting the downward angle of the barrels to take advantage of gravity. A greater downward slope would increase the rate at which the powder is dispensed and a more level, or even slight upward slope, would reduce the flow rate. Also it should be realized that the apparatus as described could be used to dispense any powder material that is granular in form and is not specifically limited to the dispensing of gun powder.

The single barrel system driven by a single speed controlled motor could provide fast flow by a motor having a constant steady drive which is switched to a pulsing drive signal for slow flow. The pulsed drive signal could provide a feed rate equivalent to a separate slow motor or gear arrangement without the cost of the additional motor or complex gear arrangement for a single motor. A pulse signal drive may be accomplished by a standard capacitor, resistor coil circuit switched on by the first detecting system. A unique advantage of such a system would be the ability to compensate for the inertia of the balance arm. The intermittent pauses of the pulsed signal would allow the balance arm to reach a stable state before adding additional powder.

As described above, the purpose of this invention is to deliver rapidly and precisely any size or shape of gun powder material. Experiments have been conducted with gun powder having granular sizes range from 0.003 inches in diameter spheres to 0.030 inches in diameter by 0.100 inch long cylinders. These experiments demonstrated the need for adjusting the fast control sensor vertically depending upon the specific size and shape of gun powder. It the fast control sensor is positioned too close to the slow barrel cut off sensor, there will be dispensed more powder that the desired amount because of the inertia force of the arm. If the fast control sensor is positioned too far below the slow control sensor the slow motor would have to operate an excessively long time to dispense the desired amount of powder. Feeding coarse powder requires a greater spacing between the fast and slow control sensors while the converse is true for fine powder. The vertical adjustment caused the first control to stop close enough to the desired weight while allowing a few seconds of operation by the slow control to deliver the precise amount of gun powder.

Figure 7:
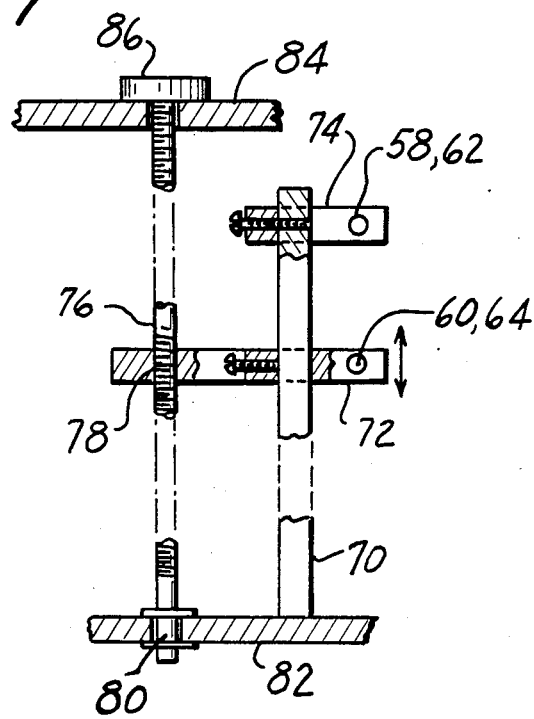
FIG. 7 is a side elevation of an alternate mounting arrangement of the sensing devices.
Figure 8:
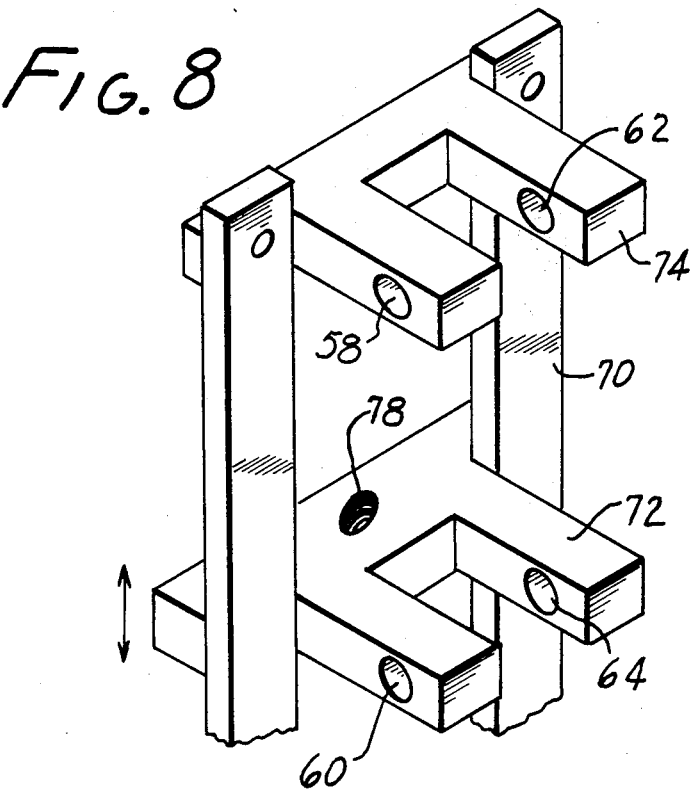
FIG. 8 is a perspective view illustration the alternate sensing device mounting system of FIG. 7.

The alternate vertical embodiment having the vertical adjustment illustrated in FIGS. 7 and 8, is comprised of a frame 70 for supporting yoke 72 on which fast control sensor 60 and 64 are mounted and yoke 74 supporting the slow control sensors 58 and 62. The yoke 74 is rigidly mounted to the frame 70 while the yoke 72 is vertically adjustable by a lead screw 76 threaded through hole 78 at the rearward portion of yoke 72. The lead screw 76 is rotatably supported at end 80 in case 82 while the other extends to another portion of the case at 84 and terminates in a rotatable adjusting knob 86. Rotation of knob 86 adjusts the vertical position of yoke 72 hence the cutoff time of the fast flow barrel. Thus for large granules yoke 72 could be adjusted further away from yoke 74 to control the time between the fast flow rate shut off and the additional period of flow from the slow rate barrel. For fine granules yoke 72 and 74 could be closer together.

An optional but preferred additional control will prevent the supply of an underweight of gun powder resolution from balance arm 48 overshooting (because of inertia) past slow control sensors 58 and 62 thereby stopping the gun powder feed, only to then fall back to a stable position below the sensors. This would result in a slight underweight in the amount of powder since the SCR of the circuit shown in FIG. 6 prevents automatic restart even though interrupter blade 47 is below center 58 and 62. To eliminate the problem of overshooting, magnets 65 and 66 may be mounted on support 55 on either side of interrupter blade 47 which is fabricated of a non magnetic but electrically conductive material such as copper, shown in FIG. 4. Magnets 65 and 66 would thus provide magnetic damping as power is generated in the electrical conductive material of the interrupter blade as ti cuts the magnetic field produced by magnets 65 and 66 thus controlling the inertial motion of the balance arm 48. Since the interrupter blade is fabricated of a non magnetic material it will not affect the static position of the arm.

Another optional control would prevent the supply of an overweight amount in part due to the resistant to motion of the balance arm (i.e. moment of inertia) until an excessive amount of gun powder is delivered to tray 50. When powder begins feeding tray 50 there is an initial very short period during which balance arm 48 resists motion and it may not start to move toward the final position until an overweight amount of gun powder is already in tray 50. This resistance to motion is eliminated by adding a spring 67 at some convenient position on the case or at another position below the portion of balance arm 48 beneath interrupter blade 47, as shown in FIG. 4. Spring 67 may be any type of common spring such as a coil spring, leaf spring etc. Spring 67 is selected so that its force on balance arm 48 goes to zero either before or when fast feed will then terminate and a precise final amount of gun powder is supplied by the slow feed system. The spring 67 effectively reduces inertial effects or resistance to motion of the balance arm by reducing starting friction and the weight of powder required to start the motion of the balance arm.

This invention is not to be limited by the embodiments shown in the drawings and described in the descripion, which are given by way of example and not of limitation, but only in accordance with the scope of the appended claims.

I claim:

1. A dispensing apparatus for dispensing a precise amount of powder to a scale comprising:
   a plurality of rotatable barrel means for dispensing said powder;
   electric drive means for rotatably driving said plurality of barrel means; said electric drive means being constructed to drive said plurality of barrel means at an independently variable rotational rate from one another;
   weighing scale means;
   opto-electronic sensing means mounted on said weighing scale electronically sensing the weight measurement on said weighing scale means as said powder is being dispensed;
   electronic circuit means for receiving the output from said opto-electronic sensing means and controlling the electric drive means for rotatable driving said plurality of barrel means at a first faster net flow rate and for switching said electronic drive means to rotate said plurality of barrel means at a second slower net flow rate as the amount of powder dispensed to said weighing scale means approaches a preselected weight and stop said electric drive means from rotating said plurality of barrel dispensing means when the amount of powder on said scale means reaches the preselected amount;
   whereby precise amounts of said powder can be rapidly and automatically dispensed and measured.

2. The dispensing apparatus according to claim in which said plurality of barrel means are open at one end and have a port at the other end for receiving powder from a chamber; and moving means in said plurality of barrel means for moving said powder received from said port toward said open end as said plurality of barrel means is rotated to dispense said powder to said scale.

3. The dispensing apparatus, according to claim 2, in which at least one of said plurality of barrel means has a smooth interior.

4. The dispensing apparatus according to claim 2 in which said moving means comprises threads in at least one of said plurality of barrel means 5. The dispensing apparatus according to claim 4 in which said electric drive means comprises a motor drive at a first steady rate being switched to a second slower rate by said electronic circuit means when said scale approaches the preselected weight.

6. The dispensing apparatus according to claim 4 in which said plurality of barrel means comprises a a pair of barrels positioned adjacent one another in said chamber.

7. The dispensing apparatus according to claim 6 in which said threads in one of said pair of barrels is selected to produce a flow rate of said powder in one of said pair of barrels slower than the other.

8. The dispensing apparatus according to claims 6 in which said electric drive means simultaneously drives both of said barrels to produce said first flow rate and then drives only one of said barrels to produce said second slower net flow rate.

9. The dispensing apparatus according to claim 5 in which said electric drive means comprises separate drive means for each of said pair of barrels.

10. The dispensing apparatus according to claim 9 in which said separate drive means simultaneously drives both of said pair of barrels until said scale reaches said a first preselected weight then one of said drive means stops.

11. The dispensing apparatus according to claim 9 in which one of said separate drive means drives one of said pair of barrels at a rotational rate slower than the other.

12. The dispensing apparatus according to claim 5 in which said pair of barrel means have different thread pitches whereby one barrel dispenses powder at a slower rate than the other.

13. The dispensing apparatus according to claim 12, in which said one barrel means having the faster rate, has a smooth interior providing infinite thread pitch.

14. The dispensing apparatus according to claim 1 in which said opto-electronic sensing means comprises photoelectric sensing means constructed and arranged to sense scale position representing the weight of powder dispensed.

15. The dispensing apparatus according to claim 14 in which said weighing scale means is a balance scale and said photoelectric means comprises first and second photoelectric sensing means mounted adjacent the arm of said balance scale whereby the first and second preselected weights are determined by sensing the position of said arm.

16. The dispensing apparatus according to claim 15 in which said first and second photoelectric means are adjustably positioned adjacent said scale arm.

17. The dispensing apparatus according to claim 15 including means for overcoming the moment of inertia of said scale balance arm.

18. The dispensing apparatus according to claim 17 in which said means for overcoming the moment of inertia of said balance arm comprises resilient biasing means applying a resilient biasing force to said balance arm.

19. The dispensing apparatus according to claim 18 in which said resilient biasing means comprises a spring on which said balance arm rests when in a non-weighing position.

20. The dispensing apparatus according to claim 18 in which said resilient biasing means comprises a pair of magnets which react with a non-magnetic electrically conducting blade attached to said balance arm to provide magnetic damping without affecting final static position of said balance arm.

* * * * *